April 28, 1959 A. J. ORSCHELN 2,883,776
SCRAPER BLADE ATTACHMENTS FOR TRACTORS HAVING
HYDRAULICALLY-CONTROLLED DRAW BARS
Filed Dec. 30, 1957 3 Sheets-Sheet 1

INVENTOR.
ALBERT J. ORSCHELN
BY
*H.B. Willson & Co.*
ATTORNEYS

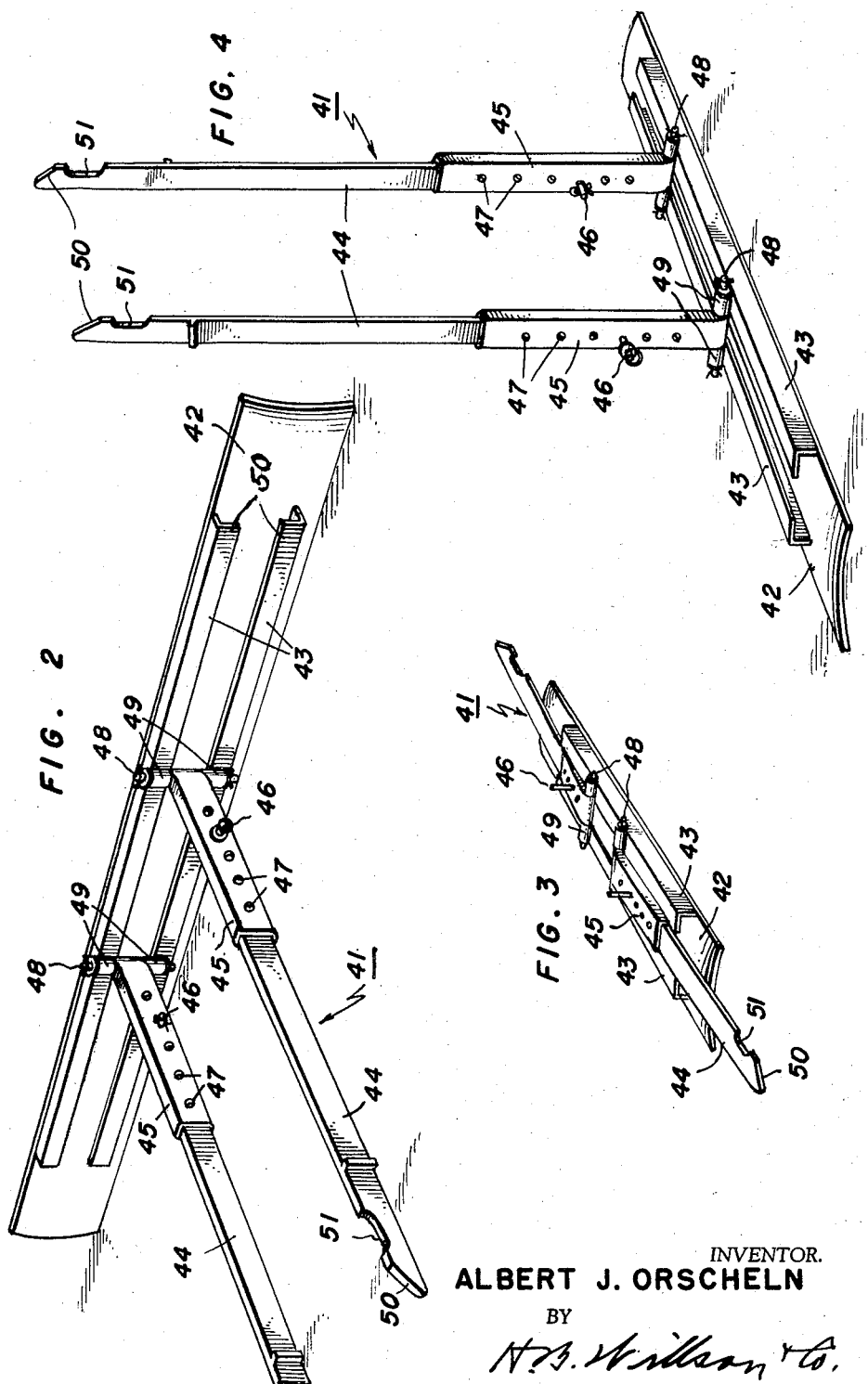

April 28, 1959  A. J. ORSCHELN  2,883,776
SCRAPER BLADE ATTACHMENTS FOR TRACTORS HAVING
HYDRAULICALLY-CONTROLLED DRAW BARS
Filed Dec. 30, 1957  3 Sheets-Sheet 3
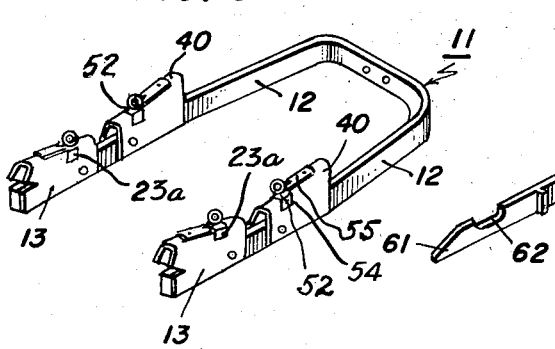
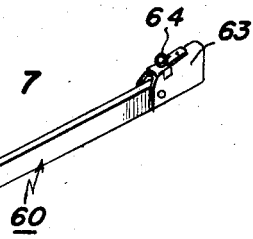
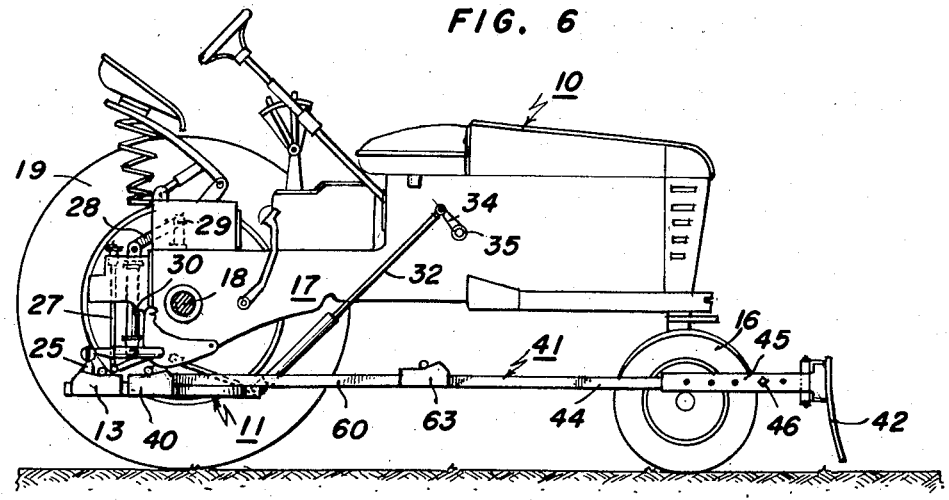
INVENTOR.
ALBERT J. ORSCHELN
BY
ATTORNEYS under # United States Patent Office 2,883,776
Patented Apr. 28, 1959

2,883,776

SCRAPER BLADE ATTACHMENTS FOR TRACTORS HAVING HYDRAULICALLY-CONTROLLED DRAW BARS

Albert J. Orscheln, Macon, Mo.

Application December 30, 1957, Serial No. 705,985

4 Claims. (Cl. 37—155)

This invention relates to attachments for tractors having hydraulically-controlled draw bars, and more particularly to an earth scraper blade attachment for quick and easy connection with and disconnection from the draw bar.

Many tractors, used by farmers, such as the "Farmall" marketed by International Harvester Company of Chicago, Illinois, have front and rear wheels with hitching means at the rear for pulling agricultural implements. The implement mounting or hitching means includes a U-shaped draw bar with rearwardly extending arms having sockets to receive shafts or arms on the implement, the sockets having latches for the quick fastening and releasing of the implement. The draw bar is mounted beneath the axle of the rear wheels for vertical adjustment and vertical swinging, and power means and hydraulic controls are provided to raise and lower the implement and adjust the working depth of it. This invention contemplates the use of such a draw bar with forwardly facing sockets to receive foldable arms on a scraper blade which may be disposed between the front and rear wheels, or, with the use of extra extension arms, the blade may be disposed in advance of the front wheel of the tractor.

One object of the invention is to provide a scraper attachment having a relatively flat blade with mounting arms hinged to its rear face at longitudinally spaced points so that when the arms are swung away from each other into longitudinal alinement and substantially parallel with the blade, and the blade is disposed with its front face on the ground, the front wheel of the tractor may be run over the central portion of the blade. That will dispose the folded attachment between the front and rear wheels so that arms may be swung up to perpendicular positions and then swung downwardly and rearwardly to bring the blade to its normal upright useable position and dispose the arms horizontally for ready entrance into the sockets on the arms of the draw bar. Thus one man may fasten the attachment to the tractor in the short time of a minute or less; and with equal speed and ease that procedure may be reversed to disconnect the attachment from the tractor and leave it in its folded condition on the ground. The attachment is particularly useful for small jobs such as cleaning out the barn or scraping up barn and feed lots. It may be applied to and removed from the tractor so quickly and easily that it may be put on the tractor at the house and used to smooth the road or lane to the field, then taken off at the field so that the tractor may be used to haul implements to till the land, or the scraper may be left on to help level the soil while disking, harrowing or planting, and finally when the particular job in the field has been completed, the attachment may be applied to the tractor to return it to the house or to smooth furrows along the ends of the field so that pickers or harvesting equipment will not have such bumpy travel across ends of the field.

Another object is to provide, in connection with the pivotal or hinged mounting of the arms on the blade, means for varying the lengths of either of the arms so that the length of the blade may be disposed at an angle to the longitudinal axis of the tractor for the purpose of deflecting the earth to one side or the other of the tractor for grading or leveling the ground while disking, harrowing or planting.

Another object is to provide additional extension arms which may be interposed between the pivoted arms on the blade and the sockets on the arms of the draw bar to dispose the scraper blade in advance of the front wheel of the tractor so that the latter may be used as a bulldozer to push brush, dirt or other material into ditches.

With the above and other objects and advantages in view, the invention resides in the novel combinations and arrangements of parts and the novel features of construction hereinafter described and claimed, and illustrated in the accompanying drawings which show the preferred embodiment of the invention.

In the drawings:

Fig. 2 is a perspective view of the attachment in its unfolded condition ready for attachment to the draw bar;

Fig. 3 is a perspective view of the attachment in its folded condition and with the front face of the blade resting on the ground so that the front wheel of a tractor may be run over its central portion to dispose the attachment between the front and rear wheels;

Fig. 4 is a perspective view of the attachment showing the mounting arms swung to perpendicular positions on each side of the tractor after the front wheel has passed over the central portion of the blade, so that on swinging the arms downwardly and rearwardly to the position shown in Fig. 2, the rear ends of the arms may be engaged with the sockets on the draw bar;

Fig. 5 is a perspective view of the U-shaped draw bar of the tractor shown in Fig. 1 with forwardly facing sockets on its two arms;

Fig. 6 is a side view similar to Fig. 1 but showing the attachment with its blade disposed in advance of the front wheel of the tractor by the use of two extension arms; and Fig. 7 is a perspective view of one of the extension arms.

Figure 1:
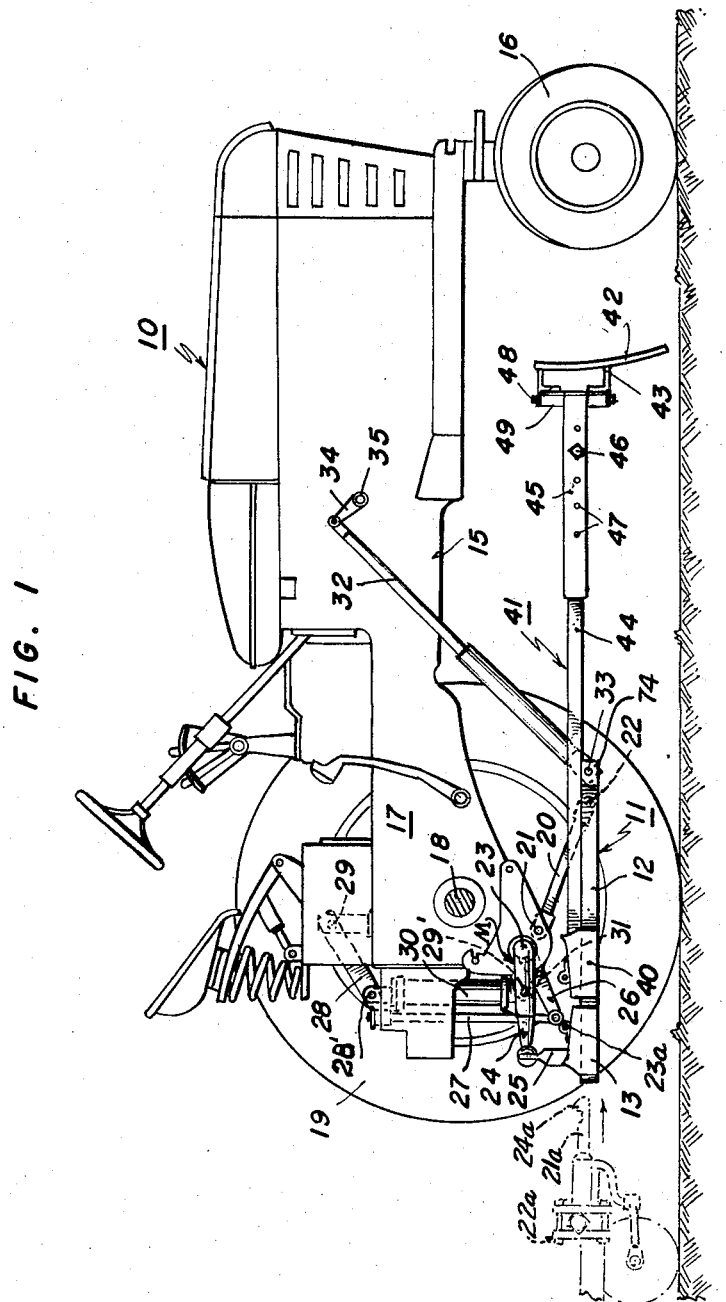
Fig. 1 is a side view of the scraper blade attachment applied to a known form of wheeled tractor.

While the invention may be applied to wheeled tractors having draw bars that are variously mounted and controlled by hydraulic and power means, I have shown in Fig. 1, the invention applied to a well known type of tractor 10 marketed by International Harvester Company and having a U-shaped draw bar 11 with rearwardly extending arms 12 carrying sockets 13 with latches 23ª for the fast hitching of an agricultural implement to the rear of the machine.

The sockets 13 open rearwardly to receive laterally spaced attaching shafts 21ª on an agricultural implement, such shafts having notches 24ª engageable by the latches 23ª, as will be understood on reference to the dotted line portion of Fig. 1 and to the Orelind Patent No. 2,776,613, January 8, 1957.

The tractor, which is rather diagrammatically illustrated, has a frame 15 supported at its front by a centrally-positioned steerable front wheel 16 or a pair of closely spaced wheels. At the rear of the frame is a housing 17 for a transverse axle 18 for driving laterally spaced rear wheels 19. The draw-bar is supported at its front by a U-shaped hanger 20 the forwardly projecting arms of which are pivoted at 21 upon the tractor body. The front arm-conecting portions of the hanger and the draw bar are pivotally connected at 22 in any suitable manner. The rear ends of the arms 12 of the draw bar are raised and lowered by lifting mechanism, generally designated at M in Fig. 1, so that the draw bar swings about the pivot 22. This mechanism is hydraulically operated and includes a U-shaped rock shaft 23 mounted on the lower portion of the housing 17 and having at its ends rearwardly extending lifting arms 24 connected by depending links 25 to the arms 12 of the draw bar. On an intermediate part of the rock shaft 23 is a rock arm 26 connected by a lift link 27 to the rear end of a rock arm 28, the forward end of which is pivoted at 29 on a bracket fixed to the tractor body. To an intermediate portion of the arm or lever 28 is pivoted at 28' the piston rod of a hydraulic cylinder 30 which has its lower end pivoted to a bracket or lug 31 fixed to the housing 17 or some fixed part carried by it. This hydraulic lift mechanism is used to raise or lower the implement attached to the rear of the draw bar. The front end of the draw bar may be raised or lowered for adjusting the operating depth of the implement being pulled, by providing an adjustable link 32 on one side of the tractor and pivoting its lower end at 33 to a lug 74 on the front end of the draw bar and pivoting the upper end of link 32 to a rock arm 34 on a shaft 35 mounted in the tractor body and operated in any suitable manner.

In the preferred embodiment of the invention I mount on the arms 12 of the draw bar adjacent the sockets 13 another pair of similar sockets 40 which are reversely disposed so that they open in a forward direction. These sockets 40 are adapted to receive the rear ends of a pair of arms 41 pivoted to a scraper blade 42, which, as shown in Fig. 1, is disposed transversely of the tractor between its front and rear wheels. The blade is preferably a substantially flat rectangular metal plate and to stiffen it and provide for the pivotal mounting of the supporting arms 41, I weld on its rear face vertically spaced longitudinally extending angle metal bars 43, as seen in Fig. 2. The arms 41 are preferably made adjustable in length to permit the blade to be angled with respect to the longitudinal axis of the tractor. As shown each arm is composed of a rear section 44 slidable and adjustable in a tubular front section 45 and adapted to be fastened in an adjusted position by a removable pin 46 insertable in any one of a longitudinal series of holes 47 in the section 45 and in an alined hole in the section 44. The two sections as shown are of rectangular shape in cross section with their wider faces disposed vertically when the scraper is in use. At the front ends of the sections 45 are formed eyes or openings to receive pivot pins 48 when such ends are disposed between pairs of apertured bearing lugs or brackets 49 welded on the rear faces of the oppositely facing flanges 50 of the angle bars 43. The pairs of bearing lugs are equally spaced from the center of the blade 42 and they are spaced from each other a sufficient distance to permit the front wheel or wheels 16 of the tractor to pass between them and over the blade when it is face down on the ground as in Fig. 3. When that has been done the arms may be lifted to the upright positions shown in Fig. 4 and then swung down to the horizontal positions shown in Fig. 2 in which they will be disposed for easy entrance into the sockets 40 with the blade in its normal useable position between the front and rear wheels of the tractor. The pivotal connections between the arms 41 and the blade not only facilitate the attachment of the scraper to the tractor but permits the blade to be angled when the length of one or both of the arms is changed.

The flat metal bars forming the rear sections 44 of the blade mounting arms have their rear ends 50 tapered or pointed to facilitate their entrance into the sockets 40 and in their upper edges are formed notches 51 to receive latches 52 on the sockets. The sockets may be longitudinally tapered inverted U-shaped plates welded on the flat sides of the arms 12 with their large ends disposed forwardly to receive the beveled ends 50 of the arms 41. The latches 52 may be pivoted or slidable in openings 54 in the tops of the small rear ends of the sockets and pressed inwardly by leaf springs 55 to snap into the notches 51.

By the use of two extension arms or bars 60 such as shown in Fig. 7, the blade 42 may be disposed in advance of the front wheel 16 as will be understood upon reference to Fig. 6. Each of these extension arms is a straight metal bar of rectangular shape in cross section similar to the sections 44. These extension arms are to be interposed between the draw bar and the arms 41 of the blade. The rear portion of each arm 60 has the same size and shape as the rear portion of a section 44, that is, it has a pointed extremity 61 to enter one of the sockets 40 and a notch 62 to coact with the latch in that socket. At the front end of each of the arms 60 is a socket 63 like one of the sockets 40. The sockets 63 have latches 64 like the latches 52. When the blade is to be used in front of the tractor, the rear ends of the arms 60 are latched in the sockets 40 of the draw bar arms 12 and the rear ends of the arms 41 of the blade are latched in the sockets 63 on the extension arms as shown in Fig. 6. When the blade is thus disposed the tractor may be used as a bulldozer.

It will be seen that the use of the attachment permits the tractor to be quickly and easily converted into a scraping or leveling machine useable as such to perform many small jobs around the farm; and that the attachment may be used in advance of various agricultural implements drawn by the tractor to facilitate the operation of the implement. It will also be noted that the use of the attachment requires no additional hydraulic or power controls since the blade is adjusted by adjusting the draw bar.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. The combination with a tractor having a centrally positioned front wheel, laterally spaced rear driven wheels, a substantially U-shaped draw bar disposed between the rear wheels and having laterally spaced and rearwardly projecting arms for the attachment of an earth working implement, and hydraulically controlled means for mounting and adjusting the draw bar, of a pair of forwardly open socket members on said arms of the draw bar and provided with latch means, a scraper blade having front and rear faces for disposition transversely of the longitudinal axes of the tractor, a pair of blade-mounting arms having ends to enter said socket members and coact with said latch means, and pivot means connecting the other ends of said arms to the rear face of said blade at longitudinally spaced points, whereby when said arms are swung away from each other into substantially parallel relation to the blade and the front face of the blade is disposed on the ground, the front wheel of the tractor may be run over the blade between said arm pivoting means to dispose the blade between the front and rear wheels of the tractor.

2. The combination of claim 1, in which each of said blade-mounting arms is composed of telescopically adjustable sections to permit the length of each arm to be varied for changing the angle of the blade relative to the longitudinal axis of the tractor.

3. The combination of claim 1 together with means for mounting the blade in advance of the front wheel of the tractor, the last mentioned means comprising a pair of extension arms adapted to be disposed between said socket member on the arms of the draw bar and said pivoted arms on the blade, each of said extension arms having an end to enter one of the draw bar socket members and coact with its latch and having at its other end a socket member with latch means to receive and fasten the free end of one of the arms of the blade.

4. A scraper blade attachment for attachment to a wheeled tractor having a hydraulically adjustable U- shaped draw bar disposed between the rear wheels of the tractor, the arms of the draw bar having forwardly open socket members with latch means, said attachment comprising a substantially flat, elongated rectangular metal plate forming a scraper blade and having front and rear faces, a pair of vertically spaced longitudinally extending reenforcing bars welded on the rear face of said plate, pairs of vertically alined bearing lugs welded on said bars and equally spaced from the center of said plate, pivot pins in said bearing lugs, a pair of foldable blade-mounting arms, each having a tubular front section and a rear section slidable in the front section to vary the length of the arm, means fixing the sections of the arms in adjusted positions, an eye on each tubular section disposed between a pair of said bearing lugs and receiving the associated pivot pin, and means on the free ends of said slidable sections to enter said socket members on said draw bar and coact with the latches thereon.

References Cited in the file of this patent

UNITED STATES PATENTS

| | | |
|---|---|---|
| 1,713,030 | Cummings | May 14, 1929 |
| 2,337,104 | Hermsmeyer | Dec. 21, 1943 |
| 2,629,944 | Arps | Mar. 3, 1953 |
| 2,695,467 | Woods | Nov. 30, 1954 |
| 2,776,613 | Orelind | Jan. 8, 1957 |

FOREIGN PATENTS

| | | |
|---|---|---|
| 132,548 | Australia | May 26, 1949 |